REGISTER POSITION IN A MULTI-STAGE SWITCHING NETWORK

Filed Aug. 13, 1963 2 Sheets-Sheet 1

INVENTORS,
JOSEPH A. CEONZO,
LEON STAMBLER &
ALFRED WEISS.
BY Harry M. Saragovitz,
Edward J. Kelly,
Herbert Berl &
Julian C. Keppler
ATTORNEYS

REGISTER POSITION IN A MULTI-STAGE SWITCHING NETWORK

Filed Aug. 13, 1963 2 Sheets-Sheet 2

INVENTORS,
JOSEPH A. CEONZO,
LEON STAMBLER &
ALFRED WEISS.
BY Harry M. Saragovitz,
Edward J. Kelly,
Herbert Berl &
Julian C. Keppler
ATTORNEYS United States Patent Office 3,290,446

Patented Dec. 6, 1966

3,290,446

REGISTER POSITION IN A MULTI-STAGE SWITCHING NETWORK

Joseph A. Ceonzo, Poughkeepsie, Leon Stambler, Brooklyn, and Alfred Weiss, Kew Gardens, N.Y., assignors to the United States of America as represented by the Secretary of the Army Filed Aug. 13, 1963, Ser. No. 302,232
3 Claims. (Cl. 179—18)

This invention relates to multi-stage switching networks and more particularly to the positioning of registers within such networks.

The principal object of this invention is to provide a novel placement of registers in a multi-stage switching network to improve the traffic handling capability of the system.

In a multi-stage switching network registers must be provided to accept the address information so that connections can be set up within the network. These registers must be available to all lines and should be located within the network so that: (1) they can be easily connected to lines, (2) they contribute little to the blocking characteristics of the system, and (3) the chances of a line being blocked from a register are minimum. The novel approach to placement of registers according to this invention is to provide a register on each secondary switch of a multi-stage switching network.

An advantage of the novel register placement of this invention is that lines connecting to registers tie up only one idle link. Since the number of links per rectangular primary switch equals the number of secondary switches, all lines have a non-blocking access to at least one register regardless of whether line to line type connections are blocking or non-blocking.

Figure 1:
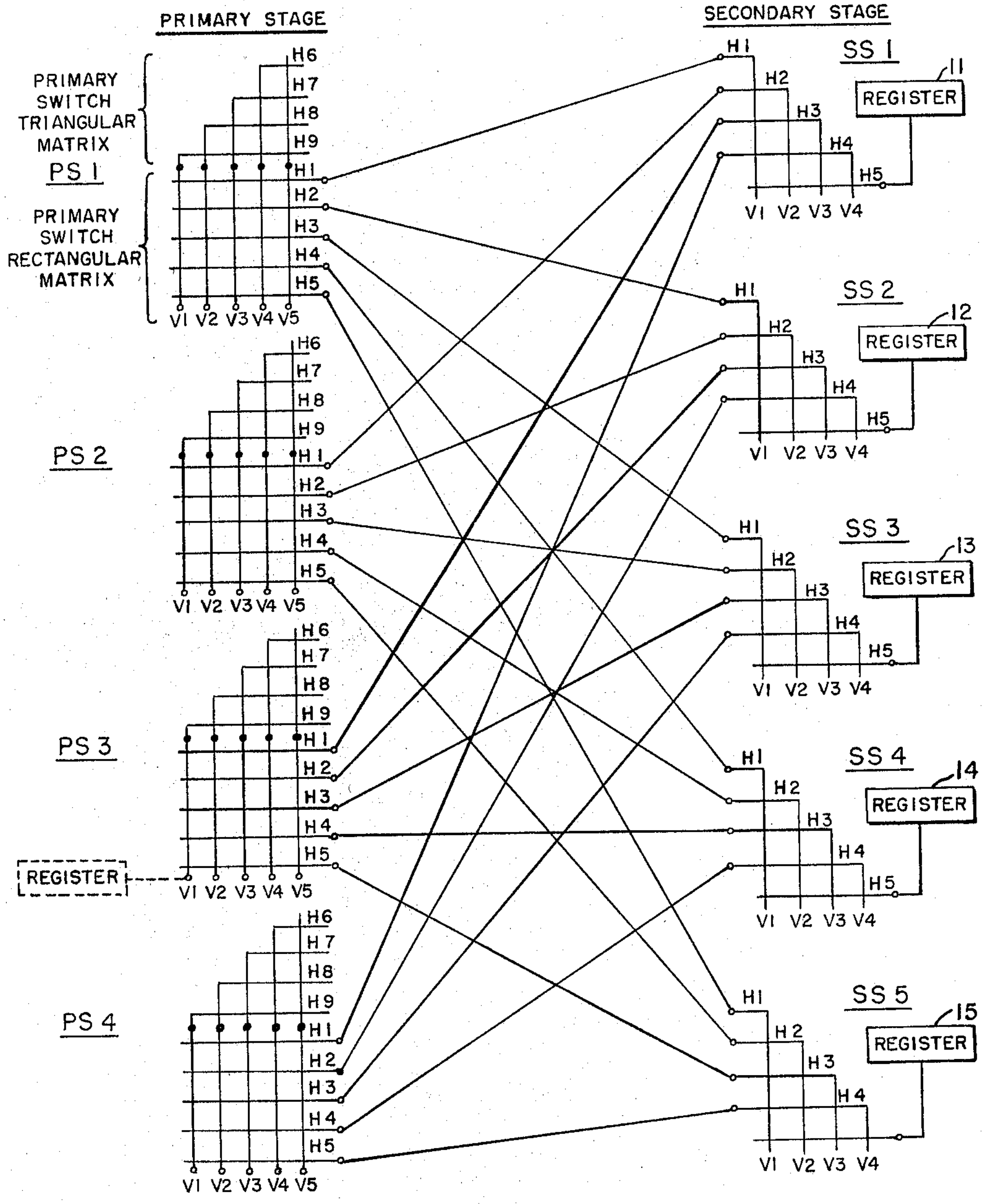
Figure 2:
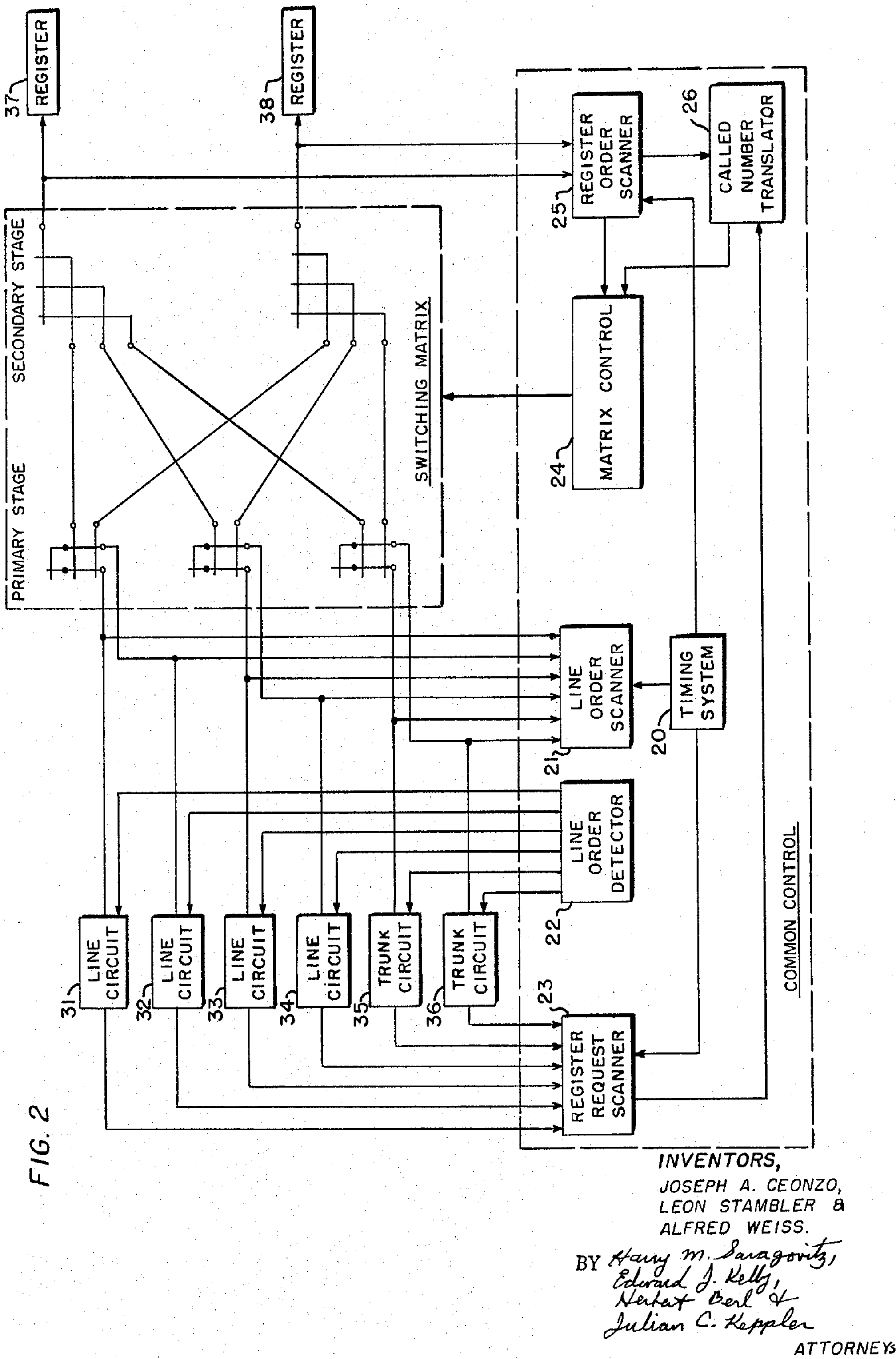

These and other objects and advantages of this invention will become more apparent from the following description taken in conjunction with the drawings in which:

FIG. 1 is a diagram showing register position in the multi-stage switching network, and FIG. 2 shows a block diagram of the major functional blocks used to effect a call.

Referring to FIG. 1, there is shown a matrix consisting of an array of rectangular primary switches and two sets of triangular matrices. The overall matrix is divided into sections labeled PRIMARY STAGE, which consists of four primary switches PS1 to PS4, and SECONDARY STAGE, which consists of five secondary switches SS1 to SS5.

Each primary switch consists of a triangular matrix, which is defined by the intersection of verticals V1 to V5 and horizontals H6 to H9, and a rectangular matrix which is defined by the intersection of verticals V1 to V5 and horizontals H1 to H5. Each secondary switch consists of a triangular matrix which comprises verticals V1 to V4 and horizontals H1 to H5. The horizontals H1 to H4 of each secondary switch are respectively coupled to one of the horizonals on each of the primary switches. For example, horizontal H1 of secondary switch SS1 is connected to horizontal H1 of primary switch PS1, horizontal H2 of switch SS1 is connected to horizontal H1 of switch PS2, and so on. Similiarly, horizontal H1 of switch SS2 is connected to horizontal H2 of switch PS1, horizontal H2 of switch SS2 is connected to horizontal H2 of switch PS2, and so on. In this manner, each primary switch is connected to each of the remaining primary switches through each of the secondary switches. Horizontal H5 on each secondary switch is connected to a register, horizontal H5 on switches SS1 to SS5 being connected to registers 11 to 15 respectively. In this type of array all lines, trunks, operators, registers, or any inputs or outputs appear as verticals on the primary switches and are interchangeable.

A connection between two lines on the same primary switch is accomplished by closing a crosspoint on the primary switch triangular matrix. Thus, if verticals V3 and V5 of switch PS2 are to be connected, the crosspoint at the intersection of vertical V5 and horizontal H7 is closed. A connection between two lines on different primary switches is accomplished by closing one crosspoint on the respective primary switch rectangular matrices and one crosspoint on the interconnecting secondary triangular switch. A typical connection of this type would be between vertical V1 of switch PS1 and vertical V3 of switch PS3. To complete such a connection, the crosspoints could be closed at the intersections of vertical V1 and horizontal H2 of switch PS1, vertical V1 and horizontal H3 of switch SS2 and vertical V3 and horizontal H2 of switch PS3. It is obvious that the connection between these two terminals could be made through any of the secondary switches unless one or more of the links involved was already in use, whereupon the number of available connecting routes would decrease.

Registers 11 to 15 are provided to accept address information in order to set up connections within the switching network. These registers must be available to all lines and trunks. Registers could be made to appear as lines on primary switches as shown by dashed lines as vertical V1 on switch PS3. This method would require two idle links in order to connect a line on a different primary switch to the register. These links are made busy during this connection and are therefore not available for line to line type connections.

The novel approach, which is the subject matter of this invention, provides a register on each of the secondary switches SS1 to SS5. With the registers on secondary switches, lines connecting to registers tie up only one idle link. Thus all lines have a non-blocking access to at least one register, regardless of whether line to line type connections are blocking or non-blocking. For example, if horizontals H1 to H4 of primary switch PS1 were in use, a vertical such as V1 would still have access to register 15 through horizontal H5.

In order to illustrate the relationship of the registers to the switching matrix and the remaining control circuitry of the system, a typical call will be traced through the switchboard. FIG. 2 shows the major functional blocks used to effect the call. For the sake of simplicity, the switching matrix is shown as having a reduced number of switches per stage and a reduced number of verticals and horizonals per switch. Line circuits 31 to 34 and trunk circuits 35 and 36 are connected to the six verticals shown in FIG. 2 as constituting the primary stage. Registers 37 and 38 are connected to one of the horizontals in each of the two secondary switches, respectively, which make up the secondary stage. Incorporated in each of the line and trunk circuits is a memory, the function of which will be hereinafter explained. A plurality of blocks are grouped together within a block labeled common control. The functions of the common control circuits are to scan all lines for calling party order signals (seizure, recall, and release), to sequentially serve all lines and trunks, to sequentially serve all registers, and to activate matrix crosspoints.

This system is characterized by its synchronous and sequential mode of operation. Each operation is alloted a time slot in which a function is carried out. This in effect eliminates any interference between functions and facilitates trouble shooting and self verification. A timing system 20 provides synchonous operation throughout the system.

To detect seizure, recall, and release signals a line order scanner 21 is incorporated in the system and functions to permit these signals to be sequentially fed to a detector 22, thereby eliminating the necessity of providing these detectors on a per line basis. When an order tone is detected, it is memorized in the line circuit memory and remains there until it is acted upon by the common control during the register request cycle to be hereinafter described. Thus an asynchronous arrival of line order tones is synchronized to the system's operation.

The line order memory in the line circuits is sampled synchronously during the register request cycle by the register request scanner 23. This scanner samples one line memory at a time to transmit by way of the called number translator 26 to the matrix control 24 the location of the calling line (primary switch number and vertical number) and service instructions.

After a cycle of the line order scanner has been completed and the line circuits have now stored such service request as initiated by the lines, the register request scanner 23 begins inspecting the line memories. The scanner pauses on each line for a time sufficient to execute any request that may exist. In this manner synchronous operation of the system is insured. That is, all orders from line circuits are executed in definite time slots.

Referring back to FIG. 1, assume that the first service request encountered by the scanner is a line seizure from vertical V5 on primary switch PS1. The common control is instructed to connect an idle register through an idle horizontal to this line. It proceeds to inspect the five horizontals from primary switch PS1 and the five registers. Thus inspection occurs sequentially on every horizontal (in primary switches) and register, because as shown in FIG. 1 each link has access to one of the five registers. The coincidence of an idle horizontal and idle register will cause the common control to choose that pair and close the crosspoints connecting the line circuit to the register.

The common control transfers the primary switch and vertical number of the calling party from the register request scanner 23 to the selected register where it is stored. Upon connection, the register returns dial tone to the line circuit informing the calling party to proceed with dialing.

The register request scanner 23 continues to inspect the line and trunk memories permitting the common control to service each in turn. This scanner continues until the call completion time cycle is reached. At this point the register order scanner 25 begins sampling the register circuits to see if any register is awaiting service. A register will request service when a line has completed dialing.

When a register requesting service is encountered it will transfer into the common control the switch and vertical number of the calling party as well as the dialed number. The common control translates the dialed number into switch and vertical number (line or trunk location).

Having the called line location, the common control is capable of checking it for an idle or busy condition in the line circuit. If a busy is detected, a busy tone gate is set in the calling line, the register, is freed, and the common control proceeds to service the next register. If, however, the called line is idle, a connection between the calling and called line will be set up in the switching network. The common control stores in temporary storage the switch location on both lines. If both lines are on the same switch, the common control provides a signal to the calling and called line circuits which enables the crosspoint in the primary switch triangular matrix to connect the two verticals together. If the lines are on different primary switches, the common control proceeds to inspect five discrete pairs of horizontals for availability. When it finds an idle pair of horizontals, it will enable the proper crosspoints to connect the calling and called lines. Simultaneously, ringing is triggered on in the called party's line circuit and the common control is free to proceed to the next register. Ringing is left under control of the line circuit where it is tripped by the called line answering or by the calling line hanging up.

What is claimed is:

1. A multi-stage switching network comprising: a plurality of primary switches, each of said primary switches consisting of a rectangular matrix of verticals and horizontals; triangular matrix means connected to said rectangular matrix verticals of each primary switch for connecting any two of said rectangular matrix verticals by closing one triangular matrix crosspoint; a plurality of triangular secondary switches; means for connecting each of said primary switches to all of the other primary switches through each of said secondary switches; and a plurality of register means, each of said register means being connected solely to a respective one of said triangular secondary switches for accepting address information so that connections can be set up within the network.

2. The switching network as set forth in claim 1 wherein said triangular secondary switches consist of a plurality of horizontals equal in number to one plus the number of primary switches, and a plurality of verticals equal in number to one fewer than the number of horizontals per secondary switch, said register means being connected to one of said plurality of horizontals on each of said secondary switches, the number of triangular secondary switches being equal to the number of horizontals per primary stage rectangular matrix.

3. A multi-stage switching network comprising: a plurality of primary switches, each consisting of a rectangular and a triangular matrix; a plurality of triangular secondary switches; conductor means for connecting each of said primary switches to all of the other primary switches through each of said secondary switches, so that a connection between lines on the same primary switch is made through a crosspoint on the triangular matrix associated with that primary switch, and a connection between lines on different primary switches is made through a crosspoint on each of the respective primary switches and a crosspoint on one of the said triangular secondary matrices; and a plurality of registers, each of said registers being connected solely to a respective one of said triangular secondary switches.

References Cited by the Examiner

UNITED STATES PATENTS

| | | | |
|---|---|---|---|
| 3,001,028 | 9/1961 | Kinsey | 179—22 X |
| 3,017,465 | 1/1962 | Gibson | 179—22 |
| 3,041,409 | 6/1962 | Zarouni | 179—22 |

KATHLEEN H. CLAFFY, *Primary Examiner.*

L. A. WRIGHT, *Assistant Examiner.*